United States Patent

[11] 3,591,136

[72] Inventor Arthur E. Bishop
5516 Westwood Lane, Birmingham, Mich. 48010
[21] Appl. No 802,359
[22] Filed Feb. 26, 1969
[45] Patented July 6, 1971

[54] ROTARY VALVE WITH CURVED VALVE SLOT
11 Claims, 8 Drawing Figs.

[52] U.S. Cl. .................................................. 251/209,
137/625.3, 91/375
[51] Int. Cl. ..................................................... F16k 5/04
[50] Field of Search .......................................... 251/209,
205; 91/375, 375 A; 131/625.3, 625.32

[56] References Cited
UNITED STATES PATENTS
1,494,796 5/1924 Muntz .......................... 251/209
2,140,292 12/1938 Jensen 251/209
2,449,833 9/1948 Barnes. 251/209
FOREIGN PATENTS
27,331 1904 Great Britain 251/209

Primary Examiner—Arnold Rosenthal
Attorney—Hill, Sherman, Meroni, Gross and Simpson ABSTRACT: A valve core for cooperation with a hydraulic valve sleeve, wherein the core is provided with a plurality of longitudinally extending grooves constructed for cooperation with mating radially inwardly facing grooves in the valve sleeve, wherein the grooves are constructed by a rolling operation in a manner permitting almost limitless variations in exact valve-land contour. The invention deals with the valve core thus constructed and a preferred valve slot configuration, along with a novel method and apparatus for the construction thereof.

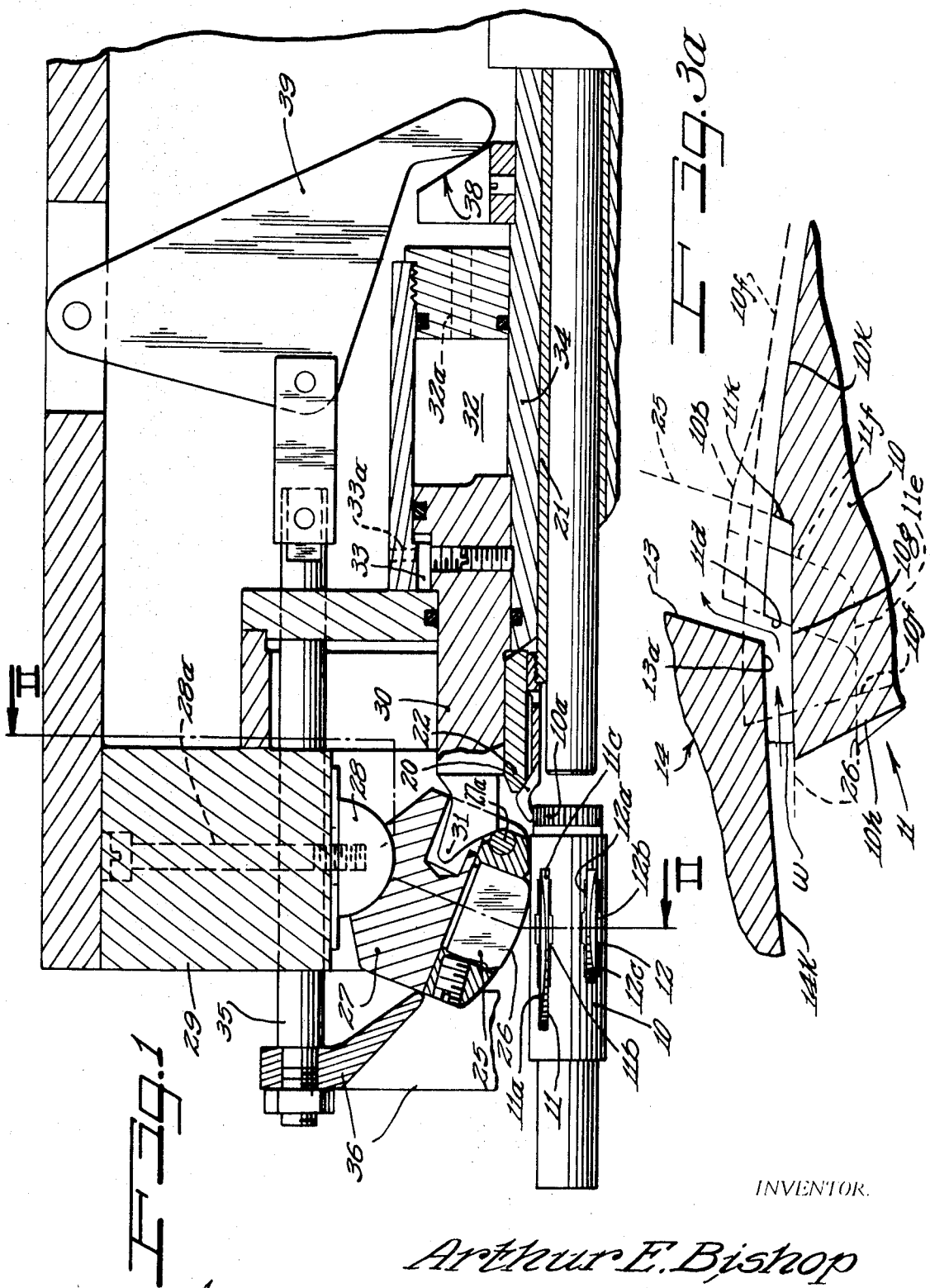

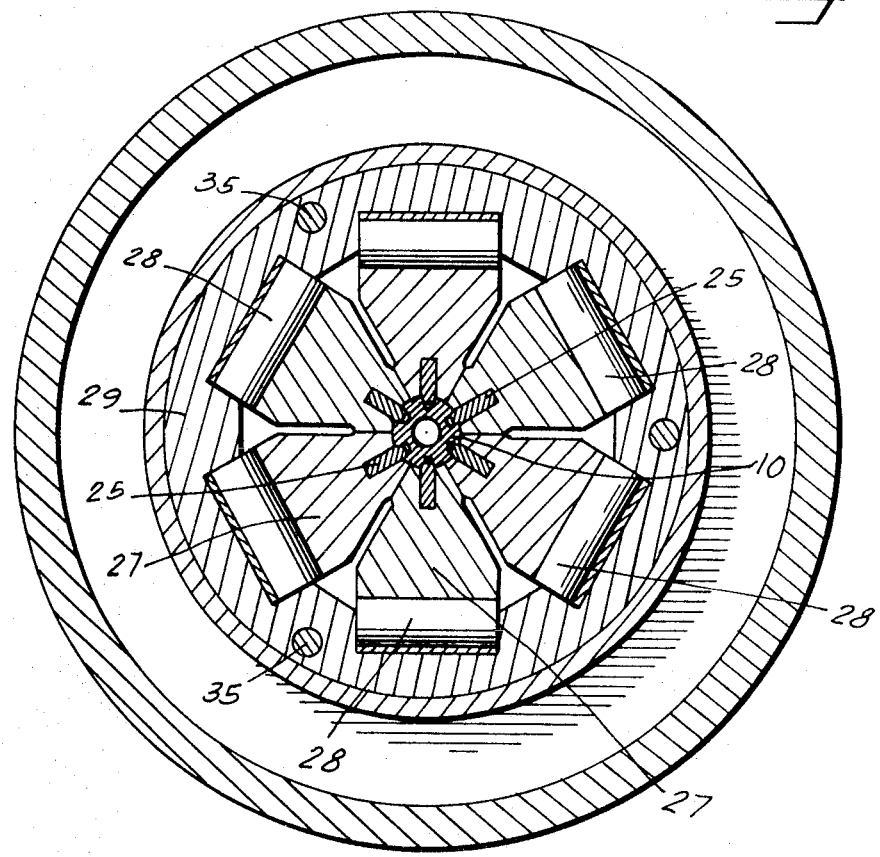
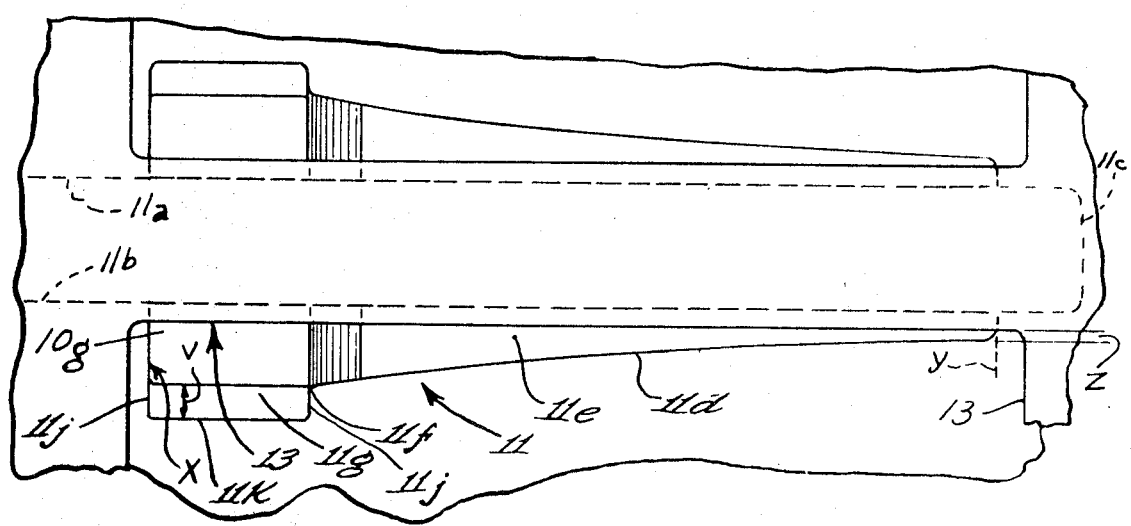

ORIFICE AREA CURVE

INVENTOR.

Arthur E. Bishop

BY Hill, Sherman, Meroni, Gross & Simpson ATTORNEYS

INVENTOR.
Arthur E. Bishop

ROTARY VALVE WITH CURVED VALVE SLOT

BACKGROUND OF THE INVENTION

This invention relates to four-way valves and is, more particularly, specifically related to such valves as utilized in two-directional control systems such as automotive vehicle power steering systems. Many valve configurations have been developed over the recent decade for utilization in vehicular power steering systems. In most recent times, the preferred form of valve has been a rotary-type valve in which a valve core of generally cylindrical configuration is oscillatably mounted within a valve sleeve and in which the valve and sleeve are each provided with a plurality of axially extending mating grooves for the control of hydraulic fluid. The flow of the fluid depends on the degree of relative angular oscillation between the valve core and the valve sleeve and the configuration of the grooves.

In accordance with prior art devices, the valve core and sleeve have been provided with a nonplanar land configuration to provide for controlled fluid flow cutoff with angular displacement of the core relative to the sleeve. The specific configuration of this groove notching, as it is commonly termed, has comprised a chamfer form in all steering valves commercially employed in the past. This is occasioned by the fact that prior art machining techniques have consisted of grinding or milling chamfers on the valve groove edges by advancing a grinding wheel or milling cutter radially toward the axis of the valve. The diameter of the cutting tool and its wear characteristic in the cutting operation have dictated the configuration of the notch. In prior devices this notch has generally taken the form of a slightly curved bevel or compound bevel. While such a bevel configuration provides a very important advantage over valving groove, or port, configurations in which no notching is employed, for the reasons advanced in my earlier U.S. Pat. No. 2,865,215, nevertheless, in the manner previously made, the bevel provides a metering surface that is very substantially removed from tangential relative to the periphery of the valve core, so that no fast change in oncenter area is possible, with the result that oncenter "feel" or response must be substantially less than optimum. Similarly, optimum linearity in the cornering range and proper parking pressure control have been impossible. Optimum groove configurations as described later, cannot be satisfactorily produced by any combination of milling cutter or grinder utilized in prior equipment.

In accordance with the present invention, a rolling method and apparatus is provided which permits an infinite variation in groove configuration. The roller employed in accordance with the present invention is of a configuration substantially identical to the slot or groove form desired and is plunged, by a toggle or wedging action, generally radially into a previously milled, generally parallel-sided slot, displacing the material at the edges of the slot into the final form. This metal manipulation is accomplished prior to hardening of the valve core and following the rolling operation the core is hardened and finish-ground.

SUMMARY OF THE INVENTION

The valve core forming the part under discussion here is generally illustrated in its normal power steering environment in my presently pending application Ser. No. 714,509, filed Mar. 20, 1968, entitled "METHOD AND APPARATUS FOR MAKING VALVE SLEEVES." As there shown, in FIGS. 1 through 3, a valve core is mounted for oscillation within a valve sleeve in a relationship in which a limited relative rotary movement is permitted after which a lost-motion connection provides a direct mechanical link between the vehicle steering shaft and the conventional hourglass steering worm. A nonpreloaded centering spring such as a torsion bar spring illustrated in FIG. 1 of the above-mentioned copending application provides resistance to valve turning which is substantially proportional to the degree of relative oscillation and provides the necessary "feel" required for truly optimum steering.

As may be observed in the disclosure of the above-mentioned copending U.S. Pat. application, the valve core grooves thereshown are provided with arcuate bevels or chamfers in the manner now common in the prior art. It has been found in analyzing the nature of optimum valve movement, however, that such a chamfer is not optimum, and, instead, a rather complex L-shaped slot opening provides optimum valve actuation. However, such an improved configuration is impossible to manufacture with milling or grinding equipment and is unknown in prior systems.

In accordance with the present invention, a rolling die is impressed into a parallel-sided slot to provide exactly the configuration desired. This rolling impression causes metal at the sides of the slot to be moved downwardly into the slot area and also upwardly and outwardly around the edges of the slot. The rolling operation is undertaken prior to hardening of the valve core and also prior to finish exterior grinding of the core. Accordingly, although the operation moves metal beyond the outer periphery of the core, the subsequent grinding of the exterior peripheral surface removes this excess material, leaving a precise valve port configuration which, after hardening, provides an ideal valve core.

It will be appreciated that the rolling die employed in accordance with the principles of the present invention can comprise a single die and that the valve core may be indexed into engagement with the die to provide sequentially any number of rolled slots in the valve core. However, in conventional practice, six slots are provided in a power steering valve core, providing three inlets and three outlet ports. It is preferred, accordingly, that a machine, be constructed providing for the simultaneous embossment of the six slots. In the rolling operation of the present invention, this provides a balanced force application to the valve core and assures complete uniformity around the periphery of the valve core. In the preferred embodiment, accordingly, six arcuately shaped dies are pivotally mounted in a toggle configuration, in position against the valve core. Upon relative axial movement between the valve core and the die members, pivotal motion of the die members occurs plunging them radially into the slots. A single axial displacement stroke causes complete rolling or coining of the valve core slots, thereby providing for precise configuration of the slots in a single machine operation. By utilizing a hardened die, such as a tungsten carbide die, it has been found that substantially no wear is encountered and the continual wheel dressing or tool sharpening of the prior art are eliminated, while at the same time, an improved valve port configuration is provided.

It is, accordingly, an object of the present invention to provide an improved, substantially less expensive valve core having an optimum valving configuration unknown in the prior art devices.

Still a further object of the invention is to provide a novel apparatus for the manufacture of an optimum valve core for power steering systems or the like which minimizes the cost of such valve cores.

Still a further object of the invention is to provide an improved and greatly simplified method of manufacturing a valve core.

A feature of the invention is the provision of an apparatus for rolling or coining a peripherally facing valve slot with an irregular, precisely controlled edge configuration.

Still other objects and features of the invention will be apparent from the description and drawings as hereinbefore set forth.

DESCRIPTION OF THE DRAWINGS

FIG. 1 is a cross-sectional view through an apparatus constructed for the rolling of a valve core in accordance with the present invention, FIG. 2 is a cross-sectional view taken along the line II–II of FIG. 1;

FIG. 3a is an enlarged cross-sectional view of the valve core and sleeve cooperation in various stages of manufacture;

FIG. 7 is a plan view of the land construction shown in FIG. 3.

DETAILED DESCRIPTION

Figure 4:
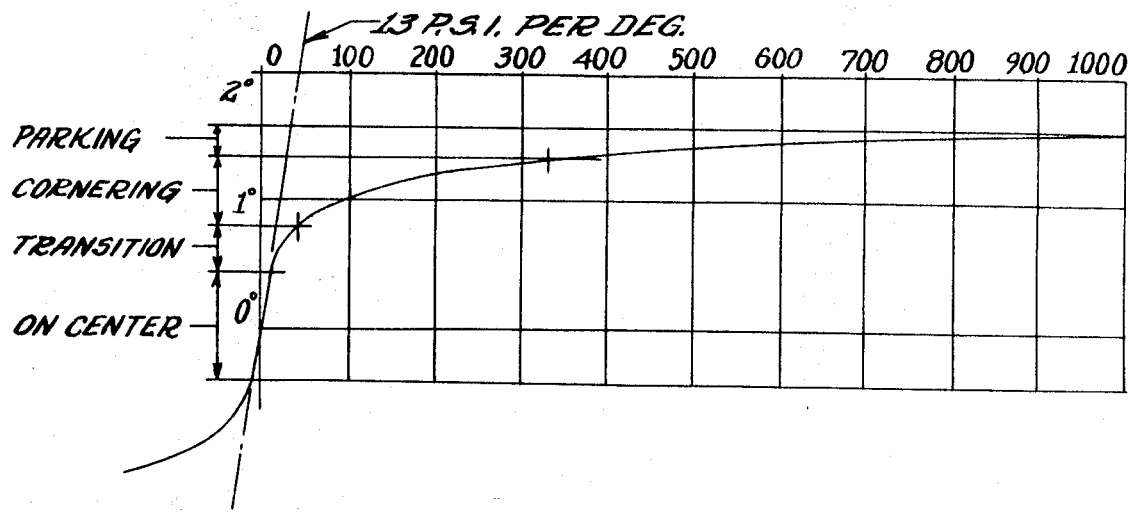
FIG. 4 is a chart illustrating a typical prior art hydraulic boost curve employed in steering systems.

As pointed out above, the valve core under consideration is of the general type illustrated in my presently pending U.S. Pat. application, U.S. Ser. No. 714,509. The valve core shown in that patent and illustrated here comprises a cylinder having a plurality of premilled axial slots. Such a valve core is illustrated here in FIG. 1, at 10, and is provided with equally spaced outlet and inlet slots 11 and 12, respectively. As initially constructed, the slots 11 and 12 are provided with generally parallel sides $11a$, $11b$ and $12a$, $12b$, respectively, and curved bottom surfaces $11c$ and $12c$, respectively. Such a core or spool, without further machining steps would provide, in cooperation with parallel-sided valve sleeve ports, a valve control function entirely unsuited to satisfactory steering control. In my earlier patent applications, the provision of nonplanar valve port sides was described in some detail and has provided, in actual practice, a very superior valve. However, in the manufacture of such valves, the problem of providing a nonplanar configuration to the edges of the valve parts has posed complicated manufacturing problems. Until the advent of the present invention, nonplanar valve edge configurations have been applied to the valve sides by the use of grinding wheels or milling cutters. Thus, a grinding wheel having a diameter of approximately 10 inches and a beveled edge may be moved radially into slots 11 and 12 of a valve core 10 to provide an arcuate bevel notch in both sides of the slot. Such an arcuate bevel notch has been used to provide an orifice area curve shown dotted from 0.02 sq. in. at 0° to 0 sq. in. at 2° at FIG. 6 and a power steering boost pressure or power assist curve generally as shown in FIG. 4. A study of FIG. 4 demonstrates several important considerations of automotive vehicle steering. There, in the oncenter condition, no boost or hydraulic pressure is applied. However, the rate of application of power in the valve of FIG. 4 is relatively great. In this respect, the structure under discussion in FIG. 4 provides a rate of pressure change through the in-line condition of approximately 13 p.s.c./°. Thus, as the steering wheel moves only slightly away from its dead center condition, hydraulic pressure in the valve groove rapidly increases, providing a substantial proportion of hydraulic power assist approximating 40 percent of total effort adjacent and through the oncenter condition. In the transition and cornering range, which are very short, the curve is shown as generally arcuate while terminating in the relatively straight-line, high-pressure portion of the curve employed in parking.

As a result of the general curvature in the cornering range, it will be observed that there is no well-defined range of linear boost in the cornering range. It has been determined that in the range of cornering conditions, it is very desirable that the boost curve comprise a substantially straight line. This linearity in the boost curve in the area of cornering provides extremely sensitive cornering which provides directly proportional "feel" and which, as a result of this "feel" provides a subjective feeling of security in the cornering operation. It will be obvious to those skilled in the art, of course, that the cornering range is a very critical range in steering operations and it is desired that the boost pressure or, in other words, the assist hydraulic pressure, be substantially directly proportional to the deflection of the steering valve, and, further, that the boost pressure increase directly as the resistance to steering wheel turn increases. Such an arrangement is not truly solved by the provision of an arcuate segment of the boost curve with its continually changing slope as shown in FIG. 4. Although many power steering gears have been manufactured and sold embodying such a boost curve, I have found that very substantially improved steering can be provided if increased linearity is provided in the boost curve in the cornering range. I have further determined that it is highly desirable, particularly when variable-ratio steering is employed, that the percentage of boost applied to the system in the operation immediately adjacent the in-line condition, may preferably be small. Thus, while it is desired that hydraulic boost supplement the manual steering effort throughout the range of steering operations, including steering at and adjacent the in-line condition, nevertheless, it is important that the percentage of boost provided in the in-line condition be relatively small compared to that in cornering and parking.

In variable-ratio gearing systems, the steering ratio may be on the order of 20-to-1 in the straight-ahead condition and very much substantially less than that as the steering system approaches the locks. In such a system, it is, of course, easier to turn the steering wheel in its central position, and the amount of power needed for assisting the driver is relatively slight. At the same time, it is desired that the vehicle operator retain a strong feeling for the road, through the steered wheels. This requires that most of the power applied to the steering gear system in the in-line condition be manual, and that only a small proportion of the power employed be supplied by way of the hydraulic power system. Thus, I have found that the available power steering pressure of 13 p.s.i./° adjacent the in-line condition provides about 40 percent power supplement which is too great a power supplement for truly satisfactory use. Accordingly, the conventional valve providing the boost curve of FIG. 4 is not a truly satisfactory answer to the steering problem.

Figure 5:
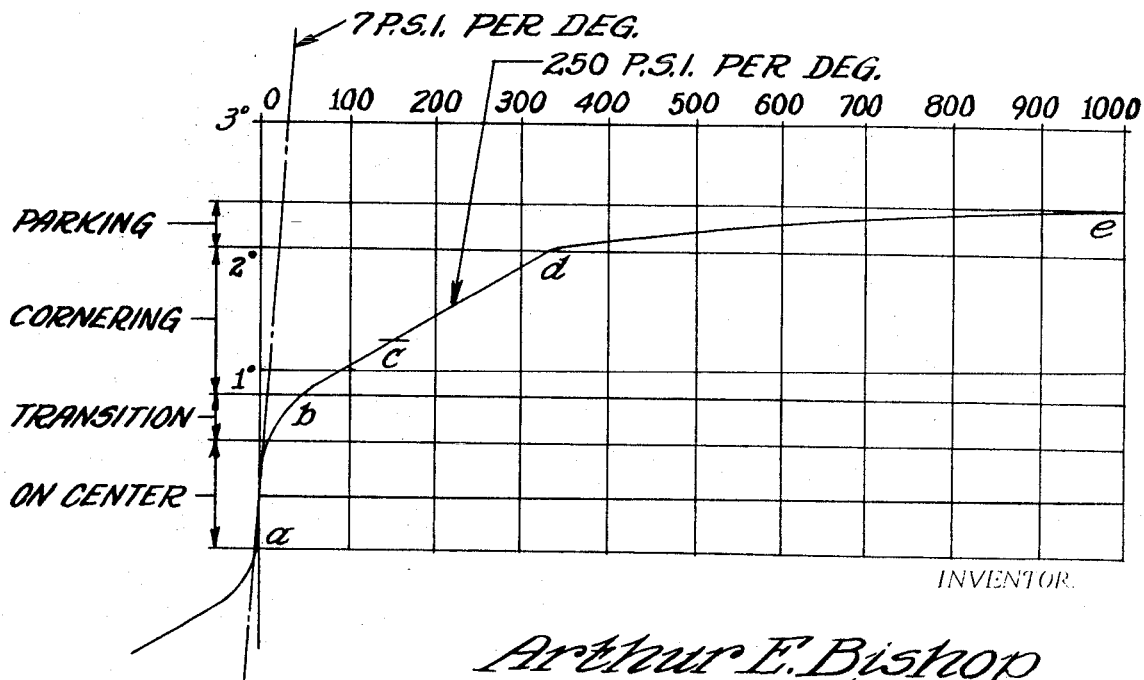
FIG. 5 is an optimum boost curve on the same basis as FIG. 4.

An optimum boost curve for purposes of truly responsive steering is shown in FIG. 5. There, it may be observed that the boost curve rises much more sharply adjacent the in-line condition, such that the tangent to the curve adjacent the in-line condition is at a figure of approximately 7 p.s.i./° of steering wheel deflection. In practice, this provides a major proportion of steering effort to be in the form of manual pressure and a minimum of hydraulic boost. A very satisfactory ratio of manual-to-power boost in the in-line and nearby positions is on the order of approximately 75 percent manual and 25 percent power, or less. Almost immediately upon leaving the in-line condition, as may be seen in FIGS. 4 and 5, it is desired that the boost curve and the valve it represents, provide a very substantially increasing rate of pressure increase with valve deflection In the cornering range, it is desired that more hydraulic boost be provided, and it is desirable that this hydraulic boost be provided in a substantially linear relationship. For example, the curve shown in FIG. 5 diverges, after the steering valve is cracked in the in-line condition upon approximately 0.7° deflection, to a substantially linear relationship along a line of approximately 250 p.s.i./° of deflection. This linearity continues through the cornering range to the parking range in which significant amounts of "feel" are unimportant. In the parking range, substantially all of the power may best be supplied by the hydraulic system and very little provided manually.

In a comparison of FIGS. 4 and 5, it will be observed that in the optimum system, the cornering range of substantial linearity of boost pressure runs from less than 1° deflection of the steering to 2° deflection, whereas in many of the prior art devices, this range runs only from less than 1° to approximately 1.3,° and, further, it will be observed that no substantial linearity is provided in this range at all in the prior art device of FIG. 4. In evaluating a large number of hydraulic power steering valves of the non preloaded, simulated or nonhydraulic feel valve, I have found that satisfactory steering may be accomplished employing the form of curve illustrated in FIG. 5 with an oncenter or straight-ahead area of low boost, but relatively high response or sensitivity, extending approximately 0.4° on each side of center followed by a transition zone from approximately 0.4° to about 0.8° with a fast-rising pressure, followed by a relatively constant or linear boost over a critical cornering range of steering torque ranging from approximately 80 to 350p.s.i. power cylinder pressure followed finally by a fast valve cutoff beyond approximately 350 p.s.i. so as to reach a maximum parking pressure of approximately 1,000 p.s.i. with very little additional valve travel.

Figure 6:
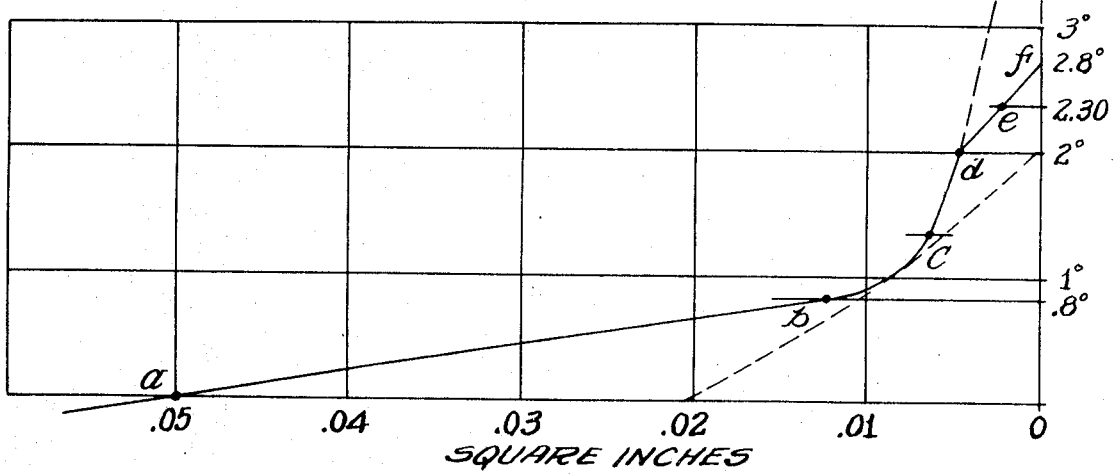
FIG. 6 is a chart showing the optimum orifice area curve for accomplishing the optimum boost curve of FIG. 5.

The above-described optimum steering hydraulic boost curve may be accomplished by way of a nonhydraulic reaction steering valve having a particular valve port configuration. Assuming, for example, the areas and pressures and deflection angles based upon a system employing a pump flow of 2.6 g.p.m. with a steering ratio on the order of 20:1 and torsion bar stiffness of 12 i.p./° of valve deflection, then, in terms of hydraulic fluid flow area permitted by the valve ports, the port configuration must provide a large oncenter area of about 0.05 s.i. which rapidly reduces to about 0.012 square inches at 0.8° as shown in FIG. 6. As the valve port continues to close, a section of a logarithmic scroll extends tangent to the oncenter line from the 0.8° point at $b$ to a point at approximately 2° and 0.005s.i. area; followed, finally, by a relatively rapid cutoff to a shut position at about 2.8° of valve deflection with an area of approximately 0.0025 inch producing a pressure on the order of 1,000 p.s.i. These areas will, of course, vary with a number of factors well known to those skilled in the art, including the flow rate of the source pump, the steering ratio of the steering gear and the centering capacity of the torsion bar spring.

To those skilled in the art of steering, the substantial difference in characteristics between a steering valve constructed in accordance with the curve of FIGS. 4 and 5 is clear. Experimental vehicles incorporating the improved form shown in FIGS. 5 and 6 have clearly demonstrated superiority in handling characteristics. This can be appreciated more readily from a consideration of several of the driving situations. In oncenter or straight-ahead drive, prior art systems actually provide an excess of boost or hydraulic assistance in the operating range through center, for example in the range of ± 1/2° of valve operation on each side of center. As above noted, with respect to the valve of FIG. 4, a pressure rise of 13 p.s.i./° results in a hydraulic assistance of approximately 40 percent of the total turning effort, whereas, an optimum valve of FIG. 5 approximately 25 percent of the output comprises hydraulic assistance. A very high percentage of hydraulic assistance or boost through the center range is undesirable because it impedes returnability of the system to the straight-ahead condition after passing through a turn and the transmission of castoring torques and road feel. These should be transmitted to the operator to provide sensitive steering and are lost when excessive hydraulic assist is provided. In the cornering range, it is not essential that the boost curve be exactly linear. However, there are advantages in having a fairly constant gradient. One reason is that all valves have some hysteresis and hence tend to mask to the driver the drop in pressure in the steering gear following the commencement of tire skidding. Thus, for example, in the valve of FIG. 5, with a 250 p.s.i./° or nearly 93 percent hydraulic assist in the region where such skid can occur, the 7 percent of output torque which is fed back to the driver by way of the manual path is just barely adequate to meet the need for feel, even if valve hysteresis is kept as low as possible. On the other hand, in the valve of FIG. 4, driver feedback is approximately half of the 7 percent and with ordinary hysteresis losses, very poor performance is found. In the parking range, any further rise in manual effort beyond the transitional point $d$ in the curve of FIG. 5 is of no value in any feel situation. Higher pressures are only necessary to turn the tires when the vehicle is stationary and hence, a rapid cutoff is very desirable to provide maximum pressure from the pump in the parking range. This rapid cutoff is clearly shown in FIG. 6 where the dotted line extension of the line $c$, $d$ illustrates a continuous rate of cutoff rather than a rapid cutoff, which latter condition is shown in the line $d$, $e$, $f$. A continuation of the slope $c$, $d$ would provide approximately 4 or 5° of valve travel before actual cutoff which, of course, would provide substantial, and undesired, amounts of manual effort in the parking range.

Figure 3:
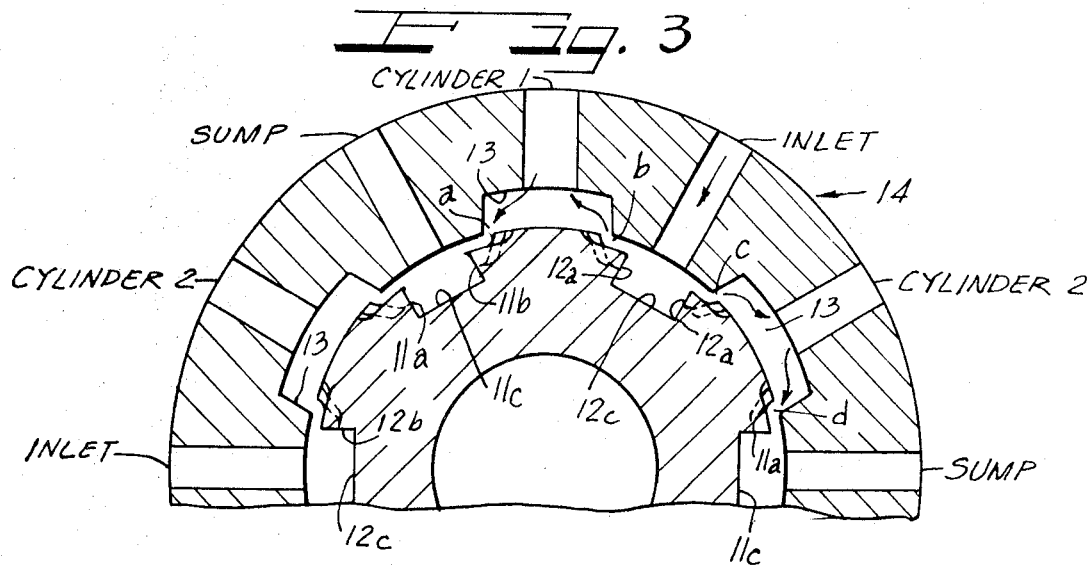
FIG. 3 is a cross-sectional view of the valve core and valve sleeve illustrating their interrelationship.

The construction of a valve port configuration meeting the requirements requires an entirely novel form of port, an example of which is shown in FIGS. 3, 3a and 7. As can there be seen, the groove 11 cooperates with a substantially straight-edged sleeve port 13. In FIGS. 3 and 7, the groove 11 and the port 13 are shown in their centered position with hydraulic fluid flowing through the gap between the valve core 10 and the sleeve 14 in the manner shown by the arrows. In the centered condition an underlapped condition exists in which flow passes through the groove throughout its overall length from $x$ to $y$ as shown in FIG. 7. This provides a large volume of hydraulic flow oncenter with a rapid and substantially constant rate of area cutoff through about 0.8° of valve deflection shown at Z in FIG. 7 and as shown in FIG. 6. Then, due to a logarithmic long scroll of the groove sidewall $11d$, with a depth $11e$ which is greater than the width between edges 13 and $11d$, the area of flow continues to decrease rapidly and then less rapidly. This is in exact conformity with the area curve shown in FIG. 6. As the valve closure approaches overlap at the point $11f$, the window $11g$ comprises substantially the only flow path and that window has sidewalls $11j$ approaching parallelism to each other. In the preferred form, the bottom surface $10g$ comprises a ramp surface approximately parallel to the surface $13a$ so that as the valve closes initially, the flow through the window $11g$ is about constant and is determined by the $10g$—$13a$ spacing. This spacing is less than the spacing between $11e$ and $13a$. The transition between the sharp cutoff provided by the sidewall $11d$ and the parallel sidewalls $11j$ coupled with flow-through the $10g$—$13a$ gap $w$ provides a curved, generally decreasing, rate of area cutoff corresponding to the portion of the curve between $b$ and $d$ of FIG. 6. As the sidewall portions $11j$ become close to parallel the rate of closure approaches zero momentarily and then further closure is determined by the peripheral spacing $v$ of the window wall $11k$ relative to the sleeve wall 13 providing, again, a more rapid rate of cutoff. It is important to provide the short window, or short leg of the L-shaped slot to provide the "knee" at $c,d,e$ in FIG. 6.

An examination of the configuration shown in FIG. 7 clearly illustrates that substantially no conventional grinding or milling cutter is capable of producing such a slot configuration in high production quantities. Very small and relatively sharp corners are provided in the slot and these have not been available with conventional manufacturing processes. In accordance with the present invention, however, the valve core grooves are readily made in a single pass with a minimum of expense and in a manner providing exactly the contour desired.

The manufacture in accordance with the present invention is accomplished by means of the rolling apparatus illustrated in FIGS. 1 and 2. As there shown, the valve core is rigidly held in an indexed position by means of a collet 20 carried by a sleeve 21 and reacting against a collet chuck 22. As the sleeve 21 is moved toward the right as viewed in FIG. 1, the collet 20 tightly grasps the valve core 10 at its right-hand end $10a$. In the embodiment illustrated, six equally spaced rolling dies 25 are provided, each of which has on the arcuate surface 26 thereof a shape substantially the same as the desired pocket or groove shape. The dies 25 are each carried in a wedge-shaped die block 27 pivotal about a fulcrum 28 rigidly secured to the carrying block 29 by a bolt $28a$. Pivotal motion is given the blocks 27 by means of a cylindrical piston 30 carrying six cam projections 31 which cooperate with pivot pins $27a$ to force the blocks to pivot in a clockwise direction as viewed in FIG. 1 when the piston 30 moves toward the left, upon the application of hydraulic pressure to the chamber 32. Simultaneously, piston 30 carries chuck 22 and workpiece 10 with it. Return movement of the die blocks 27 is accomplished by a retractor 35 carrying a ring 36 which engages the six blocks 27 and forces them in the counterclockwise pivotal direction upon the application of hydraulic fluid pressure in the chamber 33. In the position of the parts shown in FIG. 1, the valve core has just been rolled and the valve grooves are completed. The collet sleeve 21 is then moved toward the left by any conventional mechanism, not shown, releasing the core 10. Pressure is applied to the chamber 33 by any conventional hydraulic conduit 33a connected to a source of hydraulic pressure, not shown, causing retraction of the piston 30 and right-hand movement of the sleeve 34 carrying cam 38 which pivots retractor 39 carrying rods 35. With the die blocks 27 in the right-hand position a valve core is inserted in the collet pressure applied to the chamber 32 via a conduit 32a connected to the hydraulic power source and the rolling dies are pivoted in the clockwise direction. In this movement, as noted above, the valve core 10 travels with the piston 30 so that as the valve core moves axially and the die blocks 27 pivot, the die surfaces 26 are forced radially into the pockets deforming the metal of the grooves 11, 12.

The deformation of the material in the grooves may readily be seen from a consideration of FIG. 3a. There, the core 10 having the groove 11 and the valve sleeve 14 having a port 13 are shown. The solid lines illustrate the parts in their final manufactured condition. The dotted line 10f shows the valve as it is introduced into the rolling apparatus. It is approximately 0.005 inch oversize to permit final grinding. Upon passage of the roller 25, 26 metal round the edge of the groove is raised or coined upwardly in the line 10b and downwardly and into the slot 11 as at 10g and 10h, respectively. The extra metal at 10h forms no interference with the satisfactory operation of the valve, since the flow is controlled by the area between the surface 13 and the surface 11d and the gap w in the oncenter condition. Final grinding removes the material from the periphery of the valve core to provide the solid line 10k which is very slightly smaller than the inside diameter line 13a of the valve sleeve 14. Thus, by rolling, the precise configuration, sharp corners and all, is embedded into the valve groove, in a matter of seconds. A valve groove configuration not capable of manufacture at all in accordance with previous techniques has thus been accomplished and at a cost substantially less than the cost of valve configuration manufacture in prior techniques used commercially. The advantages of the rolling system are great in terms of manufacturing efficiency. Prior systems of grinding the beveled notches of prior valves are extremely sensitive to depth of grind because a slight excess in grinding depth provides not only an error in depth but an error in length and width of the effective groove area, thereby materially changing the extremely sensitive hydraulic flow patterns. This problem is substantially eliminated with the present invention. In the present construction the sidewalls or edges 11d, 11j, 11k are substantially normal to the surfaces 13a, 10k forming the plane of valve port relative movement. Flow is cut off sharply in this manner and the depth of the arc forming the edges is not critical. The ramp 10g is important only as a relatively smaller factor in controlling flow and has no effect on flow through window 11g after the edge 13 passes corner 11f at which the depth w and width v are the same and after which width v and edge 11 provide all flow control.

From the above, it will be apparent that I have devised a novel and very improved valve core for steering valves. The precise configuration may be varied to provide differing valve characteristics for differing vehicles. However, the general shape illustrated in which a window of approximately one-fifth or less of the overall axial valve port length is provided, is particularly advantageous in providing rapid peripheral valve closure in the parking range. The relatively sharp pocket corners needed to provide the curve b, c, d of FIG. 6 which in turn provides a relatively linear boost curve in the cornering range is also particularly advantageous and is accomplished only by embossing as above described. The novel method of valve manufacture and the apparatus for performing the method have very materially decreased the cost of valve core manufacture and have made possible the manufacture of the precise configurations above disclosed.

It will be apparent to those skilled in the art that while rolling is clearly the optimum technique in terms of cost, a generally radially developed valve pocket may be constructed by an electrical spark gap apparatus or an end mill of extremely small radius. Such other methods, while possible of utilization, are clearly much slower and greatly more expensive. Accordingly, the rolling or coining technique described hereinabove is my preferred embodiment.

Similarly, the embossing die may be impressed into the prepared slot radially rather than with the progressive rolling action, or the groove could be impressed without providing a previously milled slot 11, 12. Such techniques are not preferred, however. By rolling the dies 25, the load on the tool and workpiece is concentrated is applied progressively, and the total force required is much less than required otherwise. Similarly, by using the slot prepared in advance, only a small amount of metal need be deformed, at a low load level. An important advantage of the preferred techniques is that it permits extreme accuracy of configuration. With small amounts of metal movement, and low loads, little metal "spring back" occurs in the workpiece and tool deformation is also minimized.

Several variations are, of course, readily made in accordance with my invention. For example, the port form of FIG. 7 may be changed to place the relatively shallow, narrow, window 11g in the middle of x, y rather than at one end. Such a configuration is shown, for example in FIG. 1. Likewise, it is noted that in valve operation, oil pressure buildup or boost depends upon closure area of both an inlet and an outlet and hence the combined areas b and d, or a and c, depending upon the direction of relative rotation, as shown in FIG. 3. The area curve of FIG. 6 is, accordingly, the combined area of inlet and outlet and if one of the ports has a straight edge without port overlap (and hence the ports are unsymmetrical) then the shape of the other slot must provide the total area curve of FIG. 6.

The ledge, or bottom, of the impressed groove edge comprising 10g, 11e could be eliminated with a slight configuration change of edge 11d, since the bottom portion 11e does not limit flow. If 10g were eliminated, initial flow through the window would be controlled across the corner 11f—13a, providing somewhat more flow through the window during initial valve deflection than in the embodiment illustrated. The scroll 11d would, accordingly, move less slowly away from parallel in its right-hand portion as viewed in FIG. 7 to maintain the overall flow area. Similarly, the ramp or bottom portion 10g could be sloped rather than cylindrical. Such variations in shape provide readily computed flow changes, but the substantially constant width w embodiment is a preferred form.

It will be further apparent to those skilled in the art that other variations may be made in accordance with the present invention without departing from the scope of the novel concepts thereof and it is, accordingly, my intention that the scope of the invention be limited solely by that of the hereinafter appended claims.

I claim as my invention:

1. A rotary valve having cooperating relatively rotatable valve members wherein one member has at least one port groove and the other has at least one port groove arranged in overlap relation with the groove of said one member when the valve is centered, both said grooves having one side thereof extending generally transverse to the direction of relative valve member movement, one of said grooves comprising a recess having the transversely extending edge thereof relieved for at least part of its length in the direction of movement in an elongated curved pattern along the length of said edge with an abrupt recess in said curve, said relieved edge providing a sidewall approximately normal to the interface surface between the valve members at substantially all points therealong.

2. The structure of claim 1 wherein said pattern provides at least one long portion of the lying nearly perpendicular to the direction of valve travel and terminating in an edge transverse thereto to provide initial rapid flow cutoff of the overlap of the grooves upon initial relative rotation of the members away from the centered relation in the direction of port closing, said abrupt recess comprising a window area formed by a short edge portion joining the long portion of the edge in a transverse jog portion, said short edge extending nearly parallel to the long edge but trailing said long portion to provide rapid final closeoff of the ports.

3. The structure of claim 2 wherein said relieved edge is abruptly stepped for part of its depth to provide a ledge therealong.

4. A valve core for a rotary valve having cooperating concentric cylindrical sleeve and core members wherein the sleeve has at least one port groove and said core has at least one outwardly opening port groove arranged in axial overlap relation with the groove of said sleeve, and having one longitudinally extending side thereof in circumferential overlapping relation in the valve-centered condition, said groove in said core comprising a recess in the periphery thereof and having the longitudinally extending edge thereof relieved in an irregular pattern, said pattern comprising a first long portion of the edge lying nearly parallel to the axis of the core and terminating at one end in an edge transverse to its axis to provide initial rapid flow cutoff of the overlap of the grooves upon initial relative rotation of the core relative to the sleeve away from centered relation, said long portion comprising a greatly elongated scroll substantially parallel to the core axis at its point of termination and curving away from parallel to provide a rapid and then reducing rate of flow cutoff as the valve moves further away from center, and a short window area formed by a second edge portion joining the long portion in a trailing transverse jog portion and comprising a short length of edge nearly parallel to the core axis to provide rapid close-off of the flow port grooves.

5. The structure of claim 4 wherein said transverse edge is substantially parallel to the direction of valve movement.

6. The structure of claim 4 wherein said window is at one end of the port formed by the groove overlap.

7. The structure of claim 4 wherein said window is intermediate the ends of the port formed by the groove overlap and said long portion is formed of two portions on opposite sides of said window.

8. The structure of claim 4 wherein the edges forming the recess extend downwardly from the surface of the core at substantially right angles from the surface.

9. The structure of claim 4 wherein said scroll is a substantially logarithmic scroll to provide a rate of flow cutoff which reduces in a substantially exponential manner.

10. The structure of claim 4 wherein said short window edge portion is approximately one-fifth or less of the total of the long and short edge portions.

11. The structure of claim 2 wherein at the valve-centered condition the long portion has a ledge of a depth greater than the amount of its circumferential groove overlap and said short portion has a depth less than the amount of its groove overlap.